Oct. 14, 1952  J. W. WOOD  2,613,848
METHOD OF AND MEANS FOR TRANSFERRING
LIQUID SAMPLES FROM PRESSURE VESSELS
Filed Aug. 22, 1949  2 SHEETS—SHEET 1
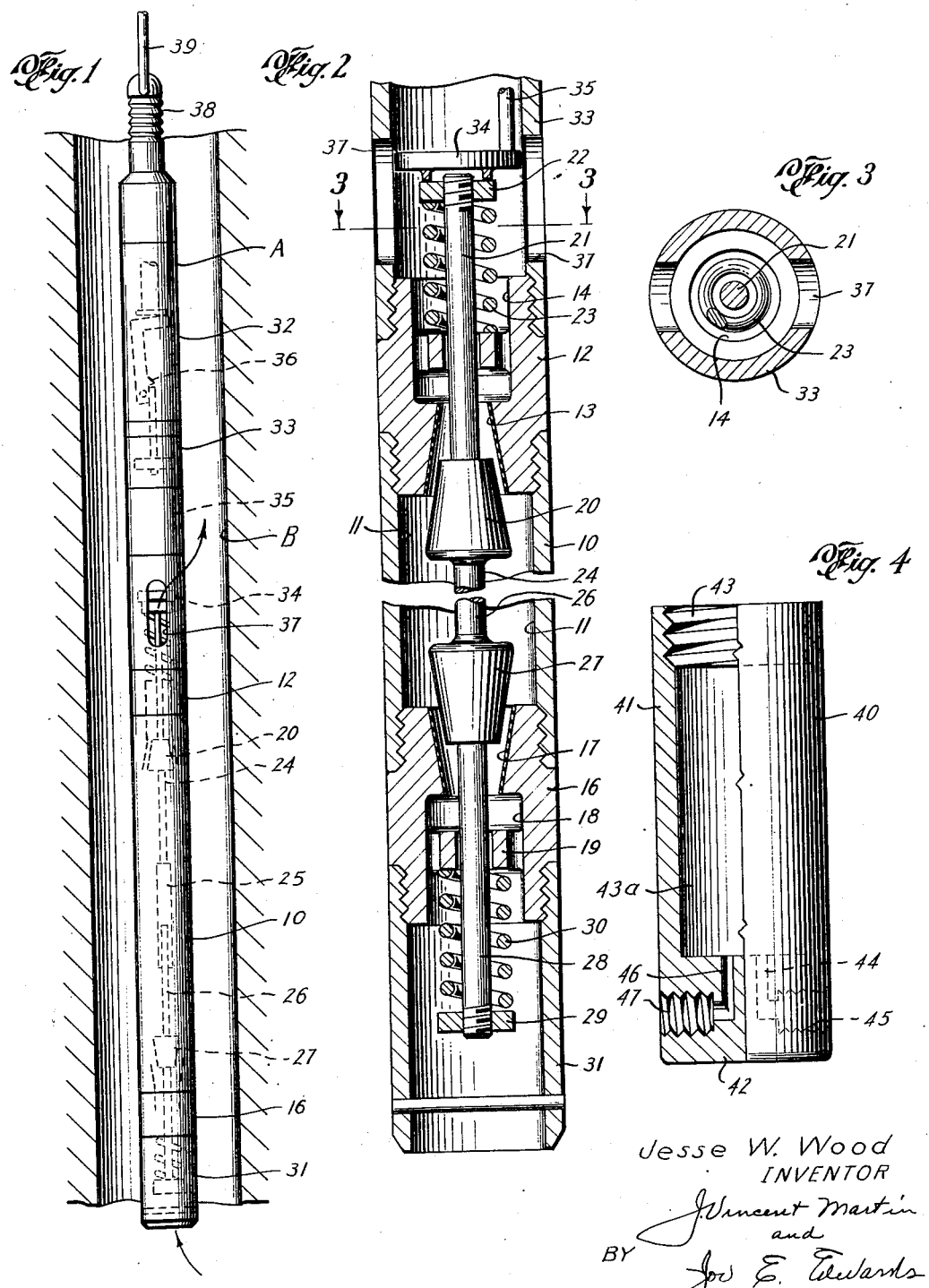
Jesse W. Wood
INVENTOR
BY J. Vincent Martin
and
Jos. E. Edwards
ATTORNEYS

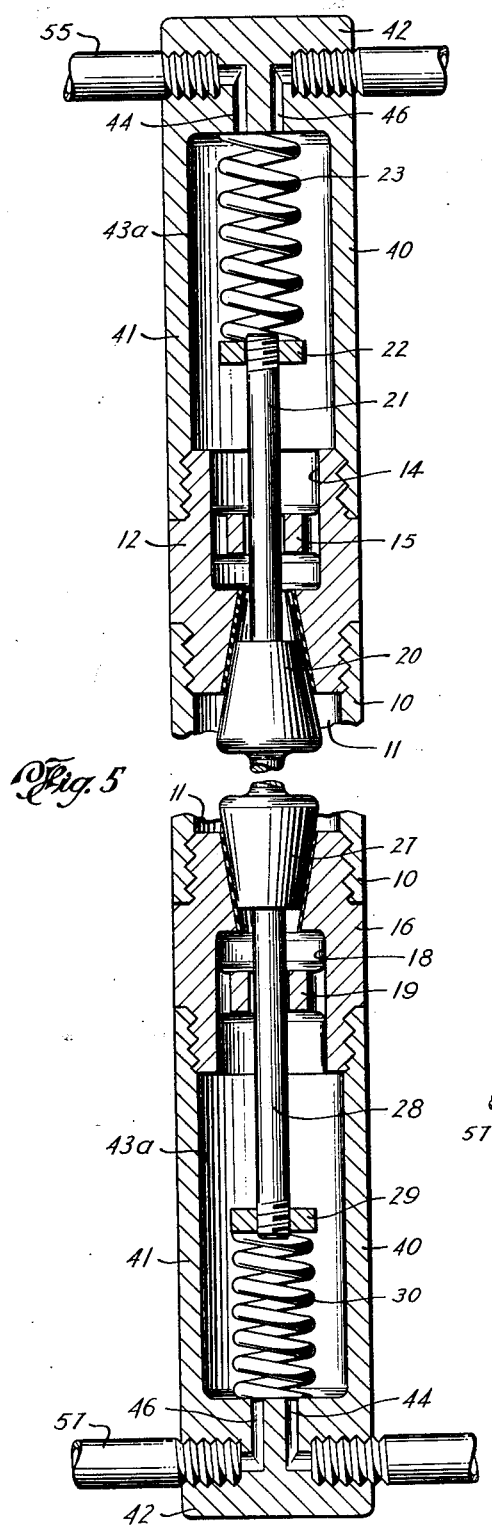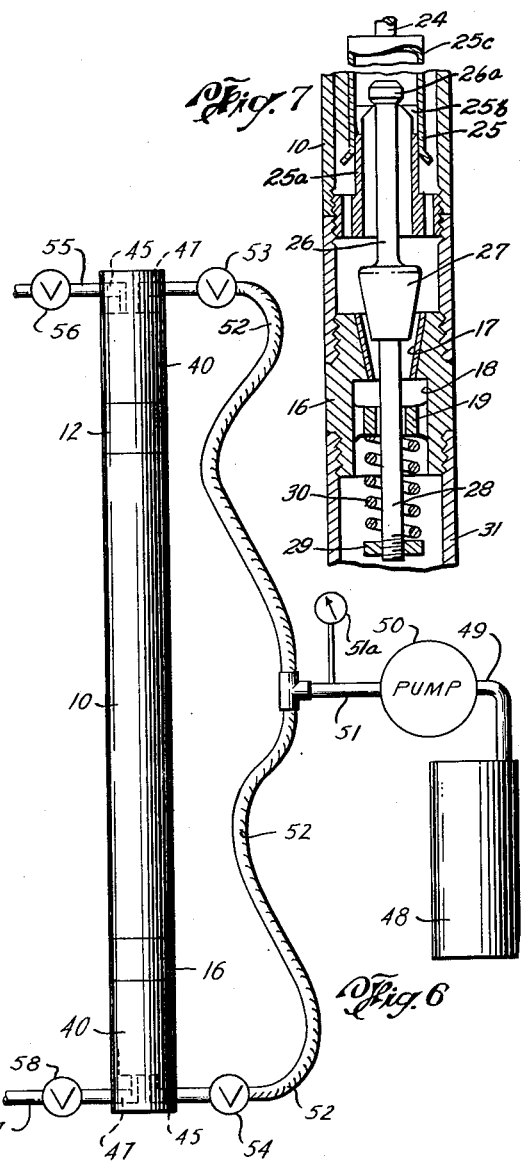

Patented Oct. 14, 1952

2,613,848

UNITED STATES PATENT OFFICE 2,613,848

METHOD OF AND MEANS FOR TRANSFERRING LIQUID SAMPLES FROM PRESSURE VESSELS

Jesse W. Wood, Shreveport, La., assignor to United Gas Pipe Line Company, Shreveport, La., a corporation of Delaware Application August 22, 1949, Serial No. 111,748

4 Claims. (Cl. 222—1)

This invention relates to new and useful improvements in methods of and means for transferring liquid samples from pressure vessels.

It is the usual practice to obtain fluid or liquid samples from within well bores by lowering a sampler device into the well bore and actuating said device to trap a sample of the well fluid within said device. Ordinarily, the device includes a sample-receiving chamber or vessel having normally open valves, whereby the sample may readily enter the chamber or vessel with time actuated means for closing the valves to trap the sample within the chamber. The sampler device is then brought to the surface and the sample is transferred to other vessels, usually after the pressure and temperature thereof have been determined.

Because the trapped sample is under a pressure, transferring of the same presents somewhat of a problem and it has been the practice to connect a transfer head to the lower end of the sample vessel and to then invert the device, after which mercury or some other heavy displacement liquid is introduced through the head into the then upper end of the sample-receiving chamber, whereby the heavier liquid falls downwardly through the fluid sample and displaces the same upwardly out of the chamber. Obviously, with this method the displacement liquid, such as mercury, must precipitate downwardly through the sample in small droplets which by agitation leads to the formation of some emulsion and contamination of the sample, which is undesirable.

It is one object of the present invention to provide an improved method and apparatus for transferring liquid samples from a sampler device which is constructed so that the sample may be displaced from the liquid chamber without contamination of the sample by the displacement liquid.

Another object of the invention is to provide an improved method for transferring a sample liquid under pressure which has been trapped within a sampler chamber which permits accurate determination of the pressure and subsequent displacement of the sample liquid from the chamber.

Another object of the invention is to provide an improved transferring apparatus and method for transferring liquid samples from a sampler device wherein duplicate transfer heads may be attached to each end of the sampling chamber and wherein the usual valves at each end of the sampling chamber may both be opened whereby the liquid sample may be displaced upwardly by introducing a displacement liquid below the sample to thereby obviate possible contamination and emulsification of said sample by said displacement.

Still another object is to provide an improved sampling device wherein the usual timing or control mechanism is normally connected to the upper end of the sample receiving chamber; said control mechanism being removable and replaceable by a transfer head which is identical to a lower transfer head adapted to be attached to the sampling chamber whereby the removal of the liquid within said chamber is facilitated.

A still further object of the invention is to provide an improved method and apparatus applicable to a sampling chamber of usual design and so constructed that any desired method of transferring the liquid sample from the chamber to another vessel, either by dripping the displacement fluid through the sample liquid, or by displacing the sample liquid upwardly by introducing the displacement liquid therebelow, may be employed.

Other and further objects of the invention will appear from the description of the invention.

In the accompanying drawings, which form a part of the instant specification, which are to be read in conjunction therewith, and wherein like reference numerals are used to indicate like parts in the various views:

Figure 1 is an elevation of a sampling device which may be of the usual and ordinary construction and showing the same lowered within a well bore, Figure 2 is a vertical sectional view of the sample receiving chamber and showing the closure valves for the chamber in their open position as the device is lowered within the well bore, Figure 3 is a horizontal cross-sectional view taken on the line 3—3 of Figure 2, Figure 4 is a view partly in section and partly in elevation of one of the transfer heads, Figure 5 is an enlarged partial vertical sectional view of the sample receiving chamber and showing the transfer heads in position thereon, Figure 6 is a diagrammatic view of the sampling chamber having the transfer heads mounted thereon and showing connection of said transfer heads with the lines through which the displacement liquid is introduced, and Figure 7 is a vertical sectional view of the interlock means between the valves.

In the drawings, the letter A designates a sampler device which is adapted to be run within a well bore B for the purpose of obtaining a liquid sample of the fluid within the well bore at a predetermined elevation. The particular details of construction of the sampler device are subject to some variation and as shown, said device includes an elongate tubular body or casing 10, the interior of which provides a sample receiving chamber 11. An upper coupling member 12 is threaded into the upper end of the tubular body 10 and is provided with an axial gasketed valve seat 13 in its lower portion. The coupling is counterbored at 14 above the gasketed valve seat 13 and has a guide spider 15 extending transversely across its interior. A similar coupling 16 having an inclined or bevelled gasketed valve seat 17 at its upper end is connected to the lower end of the body or casing 10, and this coupling is counterbored at 18 with a transverse guide spider 19 extending across its interior. An upper valve 20 having an upwardly extending valve stem 21 is adapted to coact with the seat 13 to close the upper end of the chamber 11 and this stem has a nut 22 threaded on its extreme upper end. The stem projects through the guide spider 15 and has a coil spring 23 surrounding the same and confined between the spider and the nut 22, as shown in Figure 2, whereby the spring exerts its pressure to urge the valve 20 upwardly toward a seated position. A depending valve rod 24 extends downwardly from the upper valve 20 and is connected through a telescoping interlock means 25 with a valve rod 26 of a lower valve 27. The lower valve 27 is adapted to coact with the seat 17 to close the lower end of the sample receiving chamber. A valve stem 28 depends from the lower valve through the guide spider 19 and has a nut 29 threaded onto its lower end with a coil spring 30 surrounding the stem 28 and confined between said nut and the spider whereby said spring normally functions to urge the lower valve 27 to its seated position. A tubular nose cap 31 is threaded onto the lower coupling 16 and encloses the projecting end of the valve stem 28 and its associated parts.

The particular telescoping interlock means 25 is of the type employed in the "Wofford" sub-surface sampler, manufactured by the Engineering Laboratories, Inc., of Tulsa, Oklahoma, and is illustrated in section in Figure 7. As shown in this figure, said interlock means comprises a tube 25a which is mounted axially within the casing 10 and the valve rod 26 of the lower valve 27 extends therethrough. The upper end of the tube is formed with inwardly directed latch elements 25b and the upper portion of the tube is slotted at various radial points therearound to permit the latch elements to undergo radial movement. The valve stem 26 is provided with an enlarged head 26a and when said head is above the latch elements 25b, as shown in Figure 7, the lower valve is open. The latch elements 25b are adapted to be retained or locked against outward radial movement to prevent their disengagement from beneath the head 26a by a telescoping sleeve 25c which is secured to the valve rod 24 of the upper valve. It will be evident that when the head 26a is engaged with the latch the lower valve is held open and so long as the upper valve 20 is in open or lowered position, the interlock means will hold the lower valve in its open or raised position. When the upper valve 20 seats, the retaining sleeve 25c is moved upwardly to move its flared lower end opposite the latch elements and the beveled lower end of the head 26a acting on the latches and being pulled downwardly by the spring 30 will spread the latches and allow the lower valve 27 to be seated. As has been noted the particular interlock is of well known construction and its details form no part of the present invention. It is only necessary that some type of connection be provided which will cause operation of the two valves 20 and 27 in the manner hereinafter described.

A control section 32 which includes an elongate sectional casing 33 has its lower end threaded onto the upper coupling 12 and this control section includes a suitable timing mechanism, the details of which are subject to variation and may be any suitable timing mechanism or valve actuating mechanism. The apparatus may be controlled by any of a number of well known valve actuating mechanisms and as illustrated, the timing mechanism includes an actuating piston 34 which is controlled in its movement by an operating rod 35 and said rod and piston are normally locked downwardly by a suitable latch mechanism 36. With the piston 34 latched in its lower position by the timing mechanism of the control section and with the lower valve rod 26 latched in its upper position by the interlock means 25, the valves 20 and 27 are in the position shown in Figure 2 which is an open position. Fluid within the well bore may freely flow upwardly through the sample receiving chamber 11 around the valves 20 and 27 and may escape from the interior of the device through openings 37 which are formed in the lower end of the housing 33 of the control section. The openings 37 are disposed opposite the piston 34 and are of a size to permit access to the piston whereby the timing mechanism and latch may be reset. Thus, the openings 37 function as by-pass openings and also provide access to the interior to permit reseating of the latching mechanism. The upper end of the control section has a suitable fishing neck 38 as well as a means for attaching a lowering cable 39 whereby the unit may be lowered either by means of the cable or by means of a suitable lowering tool (not shown) which may be engaged with the fishing neck 38.

As the sampling device is lowered downwardly through the well bore with the parts in position as shown in Figure 2, the piston 34 is maintaining the upper valve 20 open and through the interlock means, the lower valve 27 is held in an open position, said valves being maintained open against the pressure of their respective springs 23 and 30. During lowering the fluid may freely by-pass through the sample receiving chamber 11 and upwardly through the by-pass openings 37. When the device reaches the position at which a sample is to be taken, the device is held stationary until the timing mechanism within the control section 32 operates to release the latch 36 and this allows the piston 34 to be moved upwardly, thereby releasing the force which is maintaining the upper valve in an open position, this action raises the telescoping sleeve 25c of the interlock means to allow the valve 27 to close. It will be evident that while the device remains stationary a liquid sample enters the sample receiving chamber 11 and as the piston 34 moves upwardly the springs 23 and 30 move the valves 20 and 27 to their seated positions, thereby trapping the fluid sample within the chamber 11. It will be obvious that the fluid sample within the chamber 11 will be under the well bore pressure at the point where the sample was taken. The device is then brought to the surface and it is desirable to ascertain the pressure of the sample within the chamber 11 and to transfer said sample into another vessel where it may be properly examined.

The particular sampling device heretofore described is of a similar construction to those now in use and its details form no part of the present invention which relates to the method and apparatus whereby the pressure of the sample may be determined and said sample transferred from the sample receiving chamber 11 which is closed at both ends by the valves 20 and 27. After the sample is brought to the surface the control section 32 is removed from the upper coupling 12 and the nose cap 31 is removed from the lower coupling 16. In place of the control section and nose cap, a pair of transfer heads 40 are attached to the couplings 12 and 16, respectively. Each transfer head, as shown in Figure 4, comprises a tubular body 41 having a closed lower end 42. The upper end of the bore of the head is threaded at 43 to facilitate its connection to the couplings 12 and 16. Each transfer head has an angular passage 44 which establishes communication between the interior 43a of the head and a threaded connection opening 45. In addition a second angular passage 46 is formed in the bottom 42 of the head and establishes communication between the interior 43a and a threaded connecting passage 47.

Prior to the connection of the transfer heads 40 to the couplings 12 and 16, the nut 22 on the upper valve stem is removed, as is the spring 23 which normally surrounds the valve stem below said nut. The nut is then replaced and the spring 23 is confined between the nut and the transfer head as is clearly shown in Figure 5, and this arrangement reverses the spring to cause said spring to urge the valve toward an open position. However, it is noted that at this time the gauge pressure within the sample receiving chamber 11 is greater than the spring pressure so that the upper valve 20 remains in a closed position.

The lower spring 30 normally acting to urge the valve to a seated position is also reversed by removing the nut 29 and the spring 30 and then replacing said nut and confining the spring 30 between said nut and the lower transfer head 40. Thus, the springs 23 and 30 are reversed before the transfer heads 40 are attached to the couplings 12 and 16 and said springs are now acting in a direction to open said valves 20 and 27; however, because of the internal pressure in the chamber 11 the valves remain closed against the spring tension.

The transfer heads are then connected to a source of displacement fluid such as mercury, and the particular hook-up is illustrated in Figure 6. The source of displacement liquid is indicated at 48 and is connected through a line 49 with a pump 50. The outlet 51 of the pump is connected to the intermediate portion of a flexible tubular line 52 and one end of said tube has connection with the port 47 of the upper transfer head while the other end of the tube 52 has connection with the port 45 of the lower transfer head. A control valve 53 controls flow from the pump to the upper transfer head while a similar valve 54 controls flow from the pump to the lower transfer head. A suitable pressure gauge 51a is connected in the line 51 which extends from the pump to the tube 52. The opposite port 45 of the upper transfer head is connected to an outlet line 55 having a valve 56 therein while the other port 47 of the lower transfer head has connection with an outlet line 57 having a control valve 58 therein.

In operation the sampling device A is assembled as shown in Figure 1 and is run downwardly through the well bore to the point at which the sample is to be taken and during the lowering the timing or control mechanism within the casing 32 of the device locks the valves 20 and 27 in an open position, whereby free circulation of liquid within the bore may flow through the sample receiving chamber 11, escaping from the upper end thereof through the side openings 37. Upon reaching the point at which the sample is to be taken the device A is held stationary and the well fluid enters the sample receiving chamber 11. In accordance with its setting, the control or timing mechanism releases the latch 36 and permits the piston 34 to move upwardly whereby the springs 23 and 30 move the valves 20 and 27 to a seated position. The inner end of each of the valves 20 and 27 is of larger cross-sectional area than the outer ends and once seated the internal pressure within the sample receiving chamber 11 maintains said valves in a closed position. The device is then brought to the surface with the sample trapped within the chamber 11.

Upon recovery of the device at the surface, the control section 32 is disconnected from the upper coupling and the nose cap 31 is disconnected from the lower coupling. The springs 23 and 30 are then reversed, that is, said springs are removed from the stems and placed in a position outside of the nuts 22 and 29, respectively. The transfer heads 40 are then threaded onto the couplings 12 and 16 and the pressure conduit 52 has its ends connected to the angular passage 46 of the upper transfer head and to the angular passage 44 of the lower transfer head. The outlet lines 55 and 57 are connected to the upper and lower heads as illustrated in Figure 6. It is noted that in reversing the springs 23 and 30 each spring is confined between the transfer head and the nut 22 and 29 on the valve stem 21 and 28, respectively, and thus the springs function to tend to urge the valves 20 and 27 toward an open position but at this time the pressure of the fluid trapped within the chamber 11 maintains said valves seated.

As has been noted, the pump and source of displacement liquid has connection with the flexible pressure conduit 52. It is desirable first to fill all lines and both transfer heads 40 with mercury or displacing medium to drive out any entrapped air which would also contaminate the sample. This is accomplished by closing valves 53, 56, 54 and 58 and by loosening the connection of the flexible line 52 to valves 53 and 54. By slow operation of pump 50 the entrapped air is removed from line 52 by the displacing medium. The connections of flexible line 52 are then tightened to valves 53 and 54. Secondly, it is desirable to purge any entrapped air from both transfer heads 40 and this is done by opening valves 53 and 56 and by slow operation of pump 50 so that the displacing medium enters the upper transfer head 40 at valve 53 and air moves out by valve 56. Due to the configuration of the transfer head 40 as soon as the displacing medium begins to come out of the open valve 56 it can be presumed to be filled with the displacing medium and both valves 56 and 53 can then be closed. Inverting the sampler, which places valves 54 and 58 at the upper end, the trapped air can now be removed from the other transfer head in the same manner as described above by opening valves 54 and 58 and by slow operation of pump 50. The sampler can then be returned to its former position after closing valves 54 and 58.

To check success of sampling it is desirable to measure the pressure of the fluid within chamber 11, which, of course, is the pressure remaining after thermal drop from sampling point temperature to transfer temperature and can be calculated by conventional methods. Actual measurement of the pressure in chamber 11 as compared to calculated pressure is an index of the success of sampling. This measurement is accomplished by opening the manual control valve 54, whereby the pump 50 may apply sufficient pressure to the lower valve 27 to crack open this lower valve and said pressure may be read on gauge 51a. When the valve 27 is initially cracked pressures thereacross are equalized and the spring 23 maintains the same unseated but at this time there is no movement of fluid or liquid within the system. If the pressure as read on the gauge checks closely the calculated pressure remaining after thermal drop, a good sample can be assumed.

After the pressure measurement is made, the control valve 54 may be closed and the upper manual valve 53 is then opened whereby pressure may be applied to the upper end of the valve 20. This pressure will be suffiicent to open the upper valve and as soon as a pressure equal to that in the chamber 11 is applied the spring 23 will function to open the upper valve and allow pressures across this upper valve to equalize whereby said spring will maintain the upper valve open. The manual valve 53 is then immediately closed and the valve 54 is quickly re-opened and the displacement liquid is then pumped into the lower transfer head to permit the displacement liquid, which may be mercury, to displace the fluid from the sample chamber upwardly into the upper transfer head. Since the pressure in chamber 11 containing the sample and the pressure in the upper sample head are subtsantially equalized by opening of valve 20, the immediate application of the mercury under pressure to the lower end of the sample in the chamber 11 will result in displacing the sample as a body. Actually, although valve 20 has been opening, there is not sufficient time lapse before the lower valve 27 is opened and displacing pressure applied to allow mercury from the upper transfer head to settle or gravitate downwardly within the liquid sample in the chamber 11. There might be a very small amount of mercury which will gravitate downwardly upon the initial opening of the valve 20 but this amount may be regarded as substantially negligible. The manual valve 56 in the outlet line 55 is opened at the time the valve 54 is opened and a continued introduction of the displacement liquid will displace the fluid outwardly from the upper end of the sample receiving chamber through the outlet line. It will be evident that since the displacement liquid is introduced into the bottom of the chamber the fluid within said chamber is not contaminated or admixed with the displacement liquid but is actually moved upwardly by the liquid and forced outwardly into the outlet line 55. The outlet line may, of course, be connected to any suitable container in which it is desired to collect the fluid sample.

It is pointed out that the transfer heads 40 are exact duplicates and are interchangeable with each other, which makes for economy in manufacture. It is preferable that the displacement liquid be introduced into the lower end of the chamber so as to displace the fluid sample from the upper end of said chamber and the traisfer heads make this possible. It will be recognized that by displacing the sample upwardly from the upper end of the chamber 11, the sample is removed from the chamber without any danger of contamination or emulsification with the displacement liquid. In some instances, it may be desirable to employ the conventional method of displacing the liquid from the upper end by introducing the displacement liquid into the upper end and permitting the heavier displacement liquid to fall downwardly through the fluid sample. Although there is a possibility of contamination in this method of removal there may be circumstances where this method of removal is desirable in spite of the contamination and the particular arrangement shown makes it possible to employ either the conventional method which includes introduction of the displacement liquid into the upper end of the chamber or the improved method described wherein the displacement liquid is introduced into the lower end of the chamber. With the transfer heads connected to both ends of the chamber and with the various control valves in the pressure conduit and outlet lines, it is evident that said valves may be manipulated to control the opening and closing of the chamber valves 20 and 27 in any desired manner.

It is pointed out that the two transfer heads not only facilitate the transfer of the sample from the sampling chamber but said heads also may be used in safely transporting a sample in the sampler without danger of loss of said sample in case of failure of the gaskets which are engaged by the valves 20 and 27. In transporting the sample the heads are connected to the sampling chamber as illustrated in Figure 6 and said heads are filled with a displacement liquid such as mercury and their respective valves are then closed. Of course, at this time the transfer heads are not connected to the flexible tubing 52 and thus a unit comprising the sampling chamber and the two transfer heads provides a safe means for transporting the sample long distances to a laboratory for ultimate transfer to another container.

The particular method of transferring permits a completely closed system to be employed and therefore if one of the valve gaskets should fail during the pressure testing step or at any time before the actual transfer is to be made, there will be no loss of the sample to atmosphere since both ends of the sample chamber are connected in the system. In the former transfer methods only a single transfer head has been employed and it has occurred that a failure of the opposite valve releases the sample to atmosphere with a resulting loss of the sample. The provision of a closed system such as herein described prevents any unintentional loss of the sample due to valve failure.

From the foregoing it will be seen that this invention is one well adapted to attain all of the ends and objects hereinabove set forth, together with other advantages which are obvious and which are inherent to the structure.

It will be undertsood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having described the invention, I claim:

1. The method of transferring a fluid sample from a fluid sample receiving chamber having its ends closed by valves which are maintained seated by the pressure of the fluid sample, said method including, applying a pressure to the valve at one end of the chamber sufficient to open said valve against the pressure of the fluid sample, applying pressure against the second valve at the opposite end of the chamber sufficient to open said second valve against the pressure of the fluid sample, then introducing a displacement liquid into the chamber to displace the fluid sample from the chamber without contamination of the fluid by the displacement liquid.

2. The method of transferring a fluid sample from a fluid sample receiving chamber having its ends closed by valves which are maintained seated by the pressure of the fluid sample, said method including, applying a pressure to the valve at one end of the chamber sufficient to open said valve against the pressure of the fluid sample, then determining the pressure of the fluid sample, then applying pressure against the second valve at the opposite end of the chamber sufficient to open said second valve against the pressure of the fluid sample, then introducing a displacement liquid into the chamber to displace the fluid sample from the chamber without contamination of the fluid sample by the displacement liquid.

3. The combination with a fluid sample receiving chamber having a valve closing each end thereof to trap a sample therein, of a transferring apparatus including, a pair of transfer heads, each head being adapted to be secured to each end of the chamber with the end valve of the chamber being exposed therein, an outlet line connected to each transfer head, a pressure conduit also connected to each transfer head whereby pressure may be conducted to each head to open the valve exposed within said head, control valves connected in the outlet lines and pressure conduits for selectively opening the valves of the sample-receiving chamber and for controlling flow through said lines and conduits.

4. The combination with a fluid sample receiving chamber having a valve closing each end thereof to trap a sample therein, of a transferring apparatus including, a pair of transfer heads, each head being adapted to be secured to each end of the chamber with the end valve of the chamber being exposed therein, an outlet line connected to each transfer head, a pressure conduit also connected to each transfer head whereby pressure may be conducted to each head to open the valve exposed within said head, control valves connected in the outlet lines and pressure conduits for selectively opening the valves of the sample-receiving chamber and for controlling flow through said lines and conduits, and means for conducting a displacement liquid to the pressure conduits, whereby said displacement liquid may be introduced into the chamber to displace the fluid sample therefrom.

JESSE W. WOOD.

REFERENCES CITED

The following references are of record in the file of this patent:

UNITED STATES PATENTS

| Number | Name | Date |
|---|---|---|
| 194,847 | Shaw | Sept. 4, 1877 |
| 599,702 | Griswold | Mar. 1, 1898 |
| 765,022 | Loewenstein et al. | July 12, 1904 |
| 801,612 | Schramm | Oct. 10, 1905 |
| 916,130 | Evans | Mar. 23, 1909 |
| 916,132 | Evans | Mar. 23, 1909 |
| 954,152 | Weston et al. | Apr. 5, 1910 |
| 1,372,292 | Johnson | Mar. 22, 1921 |
| 1,691,060 | Harrison | Nov. 13, 1928 |
| 2,089,621 | Rusler | Aug. 10, 1937 |
| 2,298,627 | Proudman et al. | Oct. 13, 1942 |
| 2,321,976 | Black | June 15, 1943 |
| 2,342,367 | Pryor | Feb. 22, 1944 |
| 2,363,793 | Johnson | Nov. 28, 1944 |